US011496299B2

(12) United States Patent
Riou et al.

(10) Patent No.: US 11,496,299 B2
(45) Date of Patent: Nov. 8, 2022

(54) METHOD AND CHIP FOR AUTHENTICATING TO A DEVICE AND CORRESPONDING AUTHENTICATION DEVICE AND SYSTEM

(71) Applicant: THALES DIS CPL CANADA INC., Ottawa (CA)

(72) Inventors: Mikael Riou, Gemenos (FR); Thinh Nguyen, Gemenos (FR)

(73) Assignee: THALES DIS CPL USA, INC., Austin, TX (US)

( * ) Notice: Subject to any disclaimer, the term of this patent is extended or adjusted under 35 U.S.C. 154(b) by 220 days.

(21) Appl. No.: 16/444,595

(22) Filed: Jun. 18, 2019

(65) Prior Publication Data

US 2020/0403782 A1    Dec. 24, 2020

(51) Int. Cl.
    *H04L 9/08*      (2006.01)
    *G06F 21/31*    (2013.01)

(52) U.S. Cl.
    CPC .............. *H04L 9/088* (2013.01); *G06F 21/31* (2013.01)

(58) Field of Classification Search
    CPC ........ H04W 12/35; H04W 12/40; H04L 9/088
    See application file for complete search history.

(56) References Cited

U.S. PATENT DOCUMENTS

| 6,711,263 B1 * | 3/2004 | Nordenstam | ......... H04L 9/0825 380/278 |
| 7,111,173 B1 * | 9/2006 | Scheidt | ................. H04L 9/0866 380/46 |
| 10,078,747 B2 * | 9/2018 | Ureche | .................... G06F 21/45 |
| 11,228,421 B1 * | 1/2022 | Mesh | ....................... G06F 21/36 |
| 2002/0026574 A1 * | 2/2002 | Watanabe | ............... G06F 21/10 713/155 |
| 2007/0239995 A1 * | 10/2007 | Tucker | .................... G06F 21/72 713/189 |
| 2009/0235085 A1 * | 9/2009 | Mathur | ................. G06F 21/606 713/184 |
| 2012/0144201 A1 * | 6/2012 | Anantha | ............... H04L 9/3247 713/172 |

(Continued)

OTHER PUBLICATIONS

M. N. Aman, K. C. Chua and B. Sikdar, "Mutual Authentication in IoT Systems Using Physical Unclonable Functions," in IEEE Internet of Things Journal, vol. 4, No. 5, pp. 1327-1340, Oct. 2017. (Year: 2017).*

(Continued)

*Primary Examiner* — Kari L Schmidt
(74) *Attorney, Agent, or Firm* — THALES DIS CPL USA, Inc; Marc Boillot

(57) ABSTRACT

The invention relates to a method for authenticating to a device, comprising receiving, by the device, from a chip, data; retrieving, by the device, based on the received data, a predetermined encrypted credential; sending, by the device, to the chip, a decryption request for decrypting the encrypted credential including or being accompanied with the encrypted credential to be decrypted; retrieving, by the chip, a secret key; decrypting, by the chip, the encrypted credential by using the secret key; sending, by the chip, to the device, as a decryption request response, the credential; verifying, by the device, whether the credential is or is not valid; and authenticating, by the device, only if the credential is valid, the chip.

7 Claims, 1 Drawing Sheet

(56) References Cited

U.S. PATENT DOCUMENTS

| | | | | |
|---|---|---|---|---|
| 2012/0304312 A1* | 11/2012 | Dong | ...................... | G06F 21/00 |
| | | | | 726/28 |
| 2013/0122864 A1* | 5/2013 | Haggerty | ............ | H04W 12/069 |
| | | | | 455/411 |
| 2014/0156989 A1* | 6/2014 | Lalwani | ............ | H04W 12/0431 |
| | | | | 713/155 |
| 2014/0215589 A1* | 7/2014 | Dietrich | .................. | G06F 21/41 |
| | | | | 726/6 |
| 2014/0219447 A1* | 8/2014 | Park | ...................... | H04W 12/08 |
| | | | | 380/247 |
| 2014/0310532 A1* | 10/2014 | Ali | ...................... | G06F 12/1408 |
| | | | | 713/189 |
| 2015/0043557 A1* | 2/2015 | Ostling | ................. | H04W 48/16 |
| | | | | 370/338 |
| 2015/0163056 A1* | 6/2015 | Nix | ....................... | H04L 9/0869 |
| | | | | 380/46 |
| 2015/0318998 A1 | 11/2015 | Erlikhman et al. | | |
| 2016/0183081 A1* | 6/2016 | Flores Cuadrado | .. | H04M 15/52 |
| | | | | 455/558 |
| 2016/0218875 A1* | 7/2016 | Le Saint | ............ | H04L 63/0435 |
| 2016/0226837 A1 | 8/2016 | Kim | | |
| 2018/0046805 A1* | 2/2018 | Le Roy | ............... | G06F 21/6245 |
| 2018/0295500 A1* | 10/2018 | Yang | ...................... | H04W 60/00 |
| 2019/0122212 A1 | 4/2019 | Huxham et al. | | |
| 2019/0124616 A1* | 4/2019 | Khan | .................... | H04W 12/06 |
| 2020/0067711 A1* | 2/2020 | Abadir | ................ | H04L 63/0807 |
| 2020/0234283 A1* | 7/2020 | Greiche | ................ | H04L 9/3247 |

OTHER PUBLICATIONS

Kari Kostiainen and N. Asokan. 2011. Credential life cycle management in open credential platforms (short paper). In Proceedings of the sixth ACM workshop on Scalable trusted computing (STC '11). Association for Computing Machinery, New York, NY, USA, 65-70. (Year: 2011).*

Notification of Transmittal of the International Search Report and the Written Opinion of the International Searching Authority (Forms PCT/ISA/220, PCT/ISA/210, and PCT/ISA/237) dated Aug. 19, 2020, in corresponding International Application No. PCT/US2020/037874. (13 pages).

* cited by examiner

METHOD AND CHIP FOR AUTHENTICATING TO A DEVICE AND CORRESPONDING AUTHENTICATION DEVICE AND SYSTEM

FIELD OF THE INVENTION

The invention relates generally to a method for authenticating to a device.

Furthermore, the invention also pertains to an authentication device.

The authentication device includes a Hardware Security Module (or HSM) type device, as a first device.

Moreover, the invention concerns a chip for authenticating to a (first) device.

The present invention is notably applicable to a chip that is included in a Secure Element (or SE), as a second device.

Within the present description, an SE is a smart object that includes a chip(s) that protect(s), as a tamper resistant component(s), access to stored data and that is intended to communicate data with an external device(s), like e.g., an SE host device, such as a mobile (tele)phone or a Personal Computer (or PC).

Finally, the invention covers an authentication system. The authentication system includes one or several devices and one or several chips.

STATE OF THE ART

As known per se, an HSM generates a credential for a given user role that the HSM manages. The HSM sends the credential to a chip card, as an SE. The chip card is used by a user. The chip encrypts the credential and registers the encrypted credential. Thus, the HSM registers the chip for the concerned user role. To authenticate, the HSM requests, from the registered chip, a credential. The chip decrypts the registered encrypted credential. Then, the chip sends the credential to the HSM. The HSM does or does not authenticate, based on the received credential, the chip.

However, when a user who owns a plurality of roles, such an authentication process becomes a cumbersome and tedious operation for the user to switch from a role to (an)other role(s) by swapping possibly from a chip to (an)other chip(s).

There is a need of an alternative solution that allows authenticating, in a more secure manner, a chip.

SUMMARY OF THE INVENTION

The invention proposes a solution for satisfying the just herein above specified need by providing a method for authenticating to a device.

According to the invention, the method comprises:
receiving, by the device, from a chip, data;
retrieving, by the device, based on the received data, a predetermined encrypted credential;
sending, by the device, to the chip, a decryption request for decrypting the encrypted credential including or being accompanied with the encrypted credential to be decrypted;
retrieving, by the chip, a secret key;
decrypting, by the chip, the encrypted credential by using the secret key;
sending, by the chip, to the device, as a decryption request response, the credential;
verifying, by the device, whether the credential is or is not valid; and
authenticating, by the device, only if the credential is valid, the chip.

The principle of the invention consists in identifying, by a device, based on data received from a chip, an associated encrypted credential. Then, the device requests the chip to decrypt the encrypted credential while sending, to the chip, the encrypted credential to be decrypted. The chip gets a secret (cryptographic) key and decrypts the (received) encrypted credential by using the secret key. The chip sends the (resulting) credential in plain text (i.e. in a non-encrypted manner) to the (requesting) device. The device checks whether the (received) credential is (or not) a right one. In the positive case, the device authenticates successfully the chip.

Thus, the device accesses the encrypted credential in association with data that depends on data to be received from an associated chip to be authenticated.

The data that the device receives from a chip allows an association, at the device side, between the chip and the encrypted credential to be decrypted and sent to the chip. The data to be received from a chip plays therefore a role of a correlation IDentifier (or ID). Such data may include an ID(s) relating to the chip, a unique ID, such as a Unique Universal ID (or UUID), a (digital) token and/or any data that has been directly or indirectly registered to identify the associated encrypted credential to be used for authenticating the associated chip.

It is to be noted that the chip to be authenticated only stores the secret key, as sensitive data. The chip stores neither any credential nor any encrypted credential, as sensitive data. The chip memory footprint is therefore limited, minimum and efficient at the chip side.

The chip has just to carry out an on-the-fly decryption of the encrypted credential received from a requester, and a transmission of the (resulting) credential to the requester, in order to authenticate to the device.

A single chip may have an unlimited number of requesters, i.e. devices, which request individually to authenticate to the concerned requester by having simply to decrypt received encrypted credential by using the registered secret key and send back the (resulting) credential.

It is noteworthy that the chip does not need to know neither the requester, i.e. from whom the chip has to receive data and to whom the chip has to transmit data, nor the credential (i.e. its content value), i.e. what to decrypt, to authenticate to the device.

The invention solution is simple at a chip side, since a chip that registers merely a secret key has to decrypt data to be received by using the secret key and has to send back the (resulting) decrypted data to authenticate to a requesting device.

The invention solution is simple at a device side, since a device that registers merely an encrypted credential in association with data depending on data to be received from an identified chip has to send, to the chip, a corresponding decryption request with the encrypted credential and has to receive the corresponding credential to authenticate the chip.

The invention solution is efficient at a chip side, as the chip registers only the secret key and is able to authenticate to one or several devices without having much data to register.

The invention solution is also efficient at a device side, as the device registers only an encrypted credential in association with data allowing to retrieve the encrypted credential and the associated chip to authenticate.

The invention solution is secure at a chip side, as the chip keeps secret the secret key by not sending the secret key to any external device.

The invention solution is secure at a device side, as the device does not know any secret key to be used by a chip to authenticate and the device therefore has to involve each concerned chip to authenticate by using the secret key that is stored only by the chip.

According to an additional aspect, the invention is an authentication device. According to the invention, the authentication device is configured to:

receive, from a chip, data;

retrieve, based on the received data, a predetermined encrypted credential;

send, to the chip, a decryption request for decrypting the encrypted credential including or being accompanied with the encrypted credential to be decrypted;

receive, from the chip, as a decryption request response, the credential;

verify, whether the credential is or is not valid; and authenticate, only if the credential is valid, the chip.

According to a further aspect, the invention is a chip for authenticating to a device. According to the invention, the chip is configured to:

send, to a device, data;

receive, from the device, a decryption request for decrypting an encrypted credential including or being accompanied with the encrypted credential to be decrypted;

retrieve a secret key;

decrypt the encrypted credential by using the secret key; and send, to the device, as a decryption request response, the credential.

According to still a further aspect, the invention is an authentication system.

According to the invention, the system includes at least one device and at least one chip. The at least one device includes the authentication device as previously defined and the at least one chip includes the chip as previously defined.

When the invention solution is used in the context of the aforementioned prior art system solution in which a device(s) is(are) constituted by an HSM(s) and a chip(s) is(are) constituted by an SE chip(s), a chip authentication is easier, more traceable and more scalable by limiting the number of chips that are needed for the chip authentication with respect to the prior art solution. For instance, a single SE chip may be associated with an unlimited number of user roles with one or several HSMs.

The invention system may include a Terminal Equipment (or TE) including a (mobile) phone and one or several chips. The phone includes the above defined authentication device and the chips include the above defined chip for authenticating to the authentication device.

BRIEF DESCRIPTION OF THE DRAWINGS

Additional features and advantages of the invention will be apparent from a detailed description of one preferred embodiment of the invention, given as an indicative and non-limitative example, in conjunction with the following drawings.

DETAILED DESCRIPTION

Herein under is considered a case in which the invention method for authenticating to a device is implemented by, locally at a server side, an HSM, as a standalone and authentication device, and an SE chip, as a device to be authenticated. The authentication device does not need to cooperate with another device, at the server side, like e.g., an SE, so as to carry out the functions that are described infra and that are carried out by the HSM.

According to another embodiment (not represented), the invention method for authenticating to a device is implemented by a PC, as a first and an SE host device, and an SE chip, as a second device. According to such an embodiment, the PC cooperates with a Trusted Executed Environment (or TEE) that is adapted to carry out the functions that are carried out by the HSM and that are described infra by adding a secure execution environment in the TEE.

According to another embodiment (not represented), the invention method for authenticating to a device is implemented by a (mobile) phone, as a first and an SE host device, and a first SE chip, as a second device. According to such an embodiment, the phone cooperates with a second SE chip that is adapted to carry out the functions that are carried out by the HSM and that are described infra by adding, in the second SE chip, a secure data storage and a secure data processing. The first and/or the second SE chip may include an incorporated chip, like e.g., an embedded Universal Integrated Circuit Card (or eUICC) or an integrated Universal Integrated Circuit Card (or iUICC), in a terminal, as an SE host device, or a chip that is communicatively coupled to the terminal, as an SE host device, and included in a smart card (or another medium). The first and/or the second SE chip may be fixed to or removable from its host device. As removable SE, it may be a Subscriber Identity Module (or SIM) type card, a Secure Removable Module (or SRM), a smart dongle of the USB (acronym for "Universal Serial Bus") type, a (micro-) Secure Digital (or SD) type card or a Multi-Media type Card (or MMC) or any format card to be coupled to a host device. The second SE chip may include a TEE.

The invention does not impose any constraint as to a kind of the SE type.

Naturally, the herein below described embodiment is only for exemplifying purposes and is not considered to reduce the scope of the invention.

Figure 1:
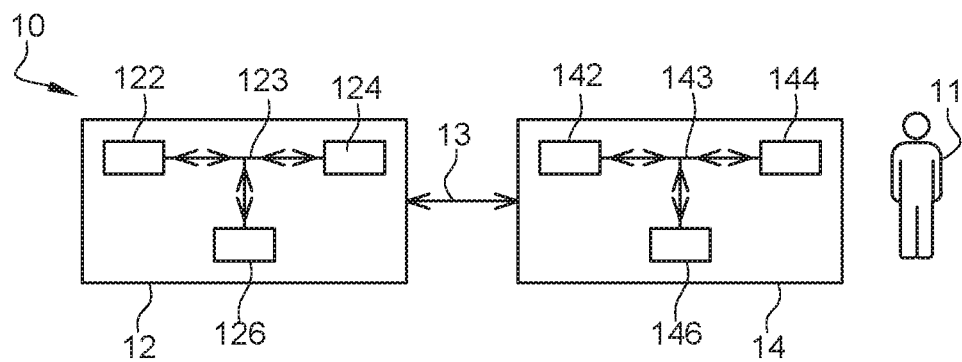
FIG. 1 illustrates a simplified diagram of an embodiment of a system comprising an HSM and a (user) (SE) chip, the HSM being arranged to receive, from the chip, data, and send back a corresponding retrieved encrypted credential, and the chip being adapted to decrypt the encrypted credential and send back a resulting credential to authenticate to the HSM, according to the invention.

FIG. 1 shows schematically an authentication system 10 including e.g., an HSM 12, as an authentication device, and e.g., a chip 14 to be authenticated to the HSM 12.

Instead of an HSM, the authentication device may include a user terminal, a PC, a desktop computer, a mobile phone, a tablet, a laptop computer, a media-player, a game console, a netbook, a smart watch, a smart jewel (or jewelry), a handset, a Personal Digital Assistance (or PDA) and/or any stationary or mobile (electronic) device. The authentication device may be any other computing device including means for processing data, comprising or being connected to communication means for exchanging data with outside, and comprising or being connected to means for storing data.

The HSM 12 includes one or several (micro)processors (and/or a (micro)controller(s)) 122, as data processing means, comprising and/or being connected to one or several memories 124, as data storing means, comprising or being connected to means for interfacing with a user 11, such as a Man Machine Interface (or MMI), and comprising or being connected to an Input/Output (or I/O) interface(s) 126 that are internally all connected, through an internal bidirectional data bus 123.

The I/O interface(s) 126 may include a wired and/or a wireless interface, to exchange, over a contact and/or ContacT-Less (or CTL) link(s) 13, with the chip 14.

Within the present description, the adjective "CTL" denotes notably that the communication means communicates via one or several Short Range (or SR) type RadioFrequency (or RF) links.

The SR type RF link(s) may be related to any CTL technology that allows the HSM 12 to exchange locally data, through a CTL type link(s) 13, with the chip 14.

The CTL link(s) 13, when present, may include a BluetooTH (or BTH), a Bluetooth Low Energy (or BLE), a Wi-Fi, a ZigBee, a Near Field Communication (or NFC) type link(s) and/or any other SR type RF communication technology link(s).

Alternatively, instead of a CTL link(s), or additionally, the HSM 12 is connected, through a wire(s) or a cable(s) (not represented), to the chip 14.

The HSM 12 MMI may include a display screen(s) (not represented), a keyboard(s) (not represented), a loudspeaker(s) (not represented) and/or a camera(s) (not represented).

The HSM 12 MMI allows the user 11 to interact with the HSM 12.

The HSM 12 MMI may be used for getting data entered and/or provided by the user 11, such as user authentication data, like e.g., a PIN and/or user biometric data (like e.g., a fingerprint(s), a facial print(s) and/or an iris print(s)).

The HSM memory(ies) 124 may include one or several volatile memories and/or one or several non-volatile memories.

The HSM memory(ies) 124 may store a first and/or a last name(s) relating to the user 11, as a user ID(s)), an International Mobile Equipment Identity (or NEI), a Mobile Subscriber Integrated Services Digital Network number (or MSISDN), an Internet Protocol (or IP) address, an International Mobile Subscriber Identity (or IMSI), a Media Access Control (or MAC) address, an email address(es) and/or the like, as an ID(s) relating to each chip (or device) to be authenticated.

The HSM memory(ies) 124 chip ID(s) may store data, such as an ID(s) relating to the HSM 12, that allows identifying uniquely and addressing the HSM 12. The HSM ID(s) may include a unique ID 1, such as a UUID 1, a Uniform Resource Locator (or URL) 1, a Uniform Resource ID (or URI) 1, and/or other data that allows identifying uniquely and addressing the HSM 12.

The HSM memory(ies) 124 stores, for each chip to be authenticated possibly for a specific user role, preferably a UID, a token and/or data that depends on data to be received from a (thus identified) chip in association with a predefined encrypted credential and associated (resource access) rights (or permission(s)). The encrypted credential is preferably loaded during a phase of registering (or enrolling) a chip (or a device) to be authenticated.

A user role(s) may include, as different specific user role(s), e.g., a (key) ceremony administrator, a system administrator, a witness, a cryptographic officer and/or (an) other specific role(s) which may depend on the concerned ceremony or act or the like.

The rights allows defining one or several resources which the user 11, possibly for the specific (user) role, has, when successfully authenticated, access to.

The concerned resource(s), as protected data, may include (non-executable) data, such as one or several data files or private data, and/or executable data, such as one or several application programs (i.e. code(s)) that, once executed, allow providing a corresponding service(s). The HSM 12 allows managing a storage of encrypted credential, as encrypted reference authentication data, per chip (or device), possibly per user role, and per (thus protected) resource.

When a user role is to be authenticated, a corresponding user role authentication is carried out by using an associated (user) chip (or device) that has to provide an associated credential, as authentication data, to submit to the HSM 12, so as to be successfully authenticated.

During a registration phase, the HSM 12 registers, i.e. stores or lets a cooperating device (not represented) that is connected or coupled to the HSM 12 store, for each chip to be authenticated within a chip (or device) set, specific data in association with an encrypted credential and one or several IDs relating to the chip (or device) to authenticate. The specific data depends on data to be received, from a chip (or device) to be authenticated, so that the HSM 12 retrieves the registered encrypted credential to be decrypted by the concerned chip (or device) to authenticate.

Alternately, an SE chip (not represented) that is connected or communicatively coupled to the HSM 12 stores at least a part of data registered for each chip to be authenticated, such as a chip ID(s) allowing the HSM 12 to identify an associated encrypted credential to be sent to the identified chip.

To register each chip (or device) to be authenticated at the HSM 12 side, the HSM 12 generates (or lets another cooperating device connected or coupled hereto generate) a credential. The HSM 12 and its interlocutor use preferably a secure channel, such as e.g., a HyperText Transfer Protocol Secure (or HTTPS) type channel or any other secure data communication channel, in order to securely exchange data. Once the HSM 12 has generated the credential, the HSM 12 sends (or lets another cooperating device connected or coupled hereto send) the credential to the concerned chip (or device). The chip (or device) encrypts the (received) credential by using a secret key (or SK) that is stored only by the chip (or device). Once encrypted, the chip (or device) sends the encrypted credential to the HSM 12. The HSM 12 stores (or lets another cooperating device connected or coupled hereto store) the (received) encrypted credential in association with chip (or device) data, such as a UID, and associated rights. Once the encrypted credential is registered, the HSM 12 deletes (or lets another cooperating device connected or coupled hereto delete) the corresponding (generated) credential, in order to not expose the credential and keep the credential confidential.

To authenticate an interlocutor, the HSM 12 (or a second cooperating chip) is arranged to receive, from a chip (or device), like e.g., the chip 14, as an HSM interlocutor, data, as an authentication request, such as a UID.

The HSM 12 is adapted to get, based on the data received from the chip (or device), a corresponding (registered) encrypted credential. The data received from the chip (or device) may be registered, either as such, or, after a data processing(s), such as e.g., a decryption of the data received from the chip (or device), in association with a corresponding encrypted credential. The encrypted credential may be registered in association with one or several IDs relating, each, to a user role. The encrypted credential is registered in association with one or several IDs relating to the chip (or device) to be identified and authenticated. The chip ID(s) allows identifying uniquely and addressing the chip (or device) to be authenticated. The chip ID(s) may include a unique ID 2, such as a UUID 2, a URL 2, a URI 2 and/or other data that allows identifying uniquely and addressing the chip (or device) to be authenticated.

The HSM 12 is configured to send, to the chip (or device), a decryption request along with the corresponding (registered) encrypted credential.

The HSM 12 is arranged to receive, from the chip (or device), the credential, as a decryption request response, as a result of a decryption of the (sent) encrypted credential.

According to an essential invention feature, the HSM 12 is adapted to verify, whether the (received) credential is or is not valid.

If the credential is not valid, then the HSM 12 fails to authenticate the chip (or device).

Otherwise, i.e. if the credential is valid, the HSM 12 authenticates successfully the chip (or device).

To ascertain that the credential is valid, the HSM 12 is arranged to get or retrieve a (previously stored) encrypted key (or Kenc). The HSM 12 is configured to decrypt successfully the (retrieved) Kenc by using the (received) credential. The key (or K) in plain text, i.e. a non-encrypted key, has been used for encrypting one or several resources that are authorized to be accessed. The resource(s) belong(s) to either a chip user who is authorized to access the concerned resource(s) or a role which a chip user has and authorizes to access the concerned resource(s). Only when the credential is successfully validated or authenticated by the HSM 12, the HSM 12 decrypts the encrypted resource(s) by using K, as a decrypted Kenc, in order to access the concerned resource(s).

The HSM 12 carries out preferably one or several security functions.

The security function(s) include(s) preferably a credential deletion (or erasure) operation that is executed, once the HSM 12 has or has not validated the received credential. Such an HSM credential deletion operation allows reducing the risk that a hacker or a malicious software retrieves the credential. The HSM credential deletion operation therefore increases the protection of the concerned credential.

The security function(s) include(s) preferably a data encryption process, by using, as a sender of data, such as e.g., the encrypted credential, a public key relating to a chip (or device) to be authenticated, as an HSM interlocutor, so as to generate encrypted data, prior to its sending, in a protected manner, to the HSM interlocutor.

The security function(s) include(s) preferably a data decryption process by using a private key related to the HSM 12, so as to decrypt data that is received in an encrypted manner, after its receipt from the HSM interlocutor.

The chip 14 includes one or several (micro)processors (and/or a (micro)controller(s)) 142, as data processing means, comprising and/or being connected to one or several memories 144, as data storing means, comprising or being connected to means for interfacing with a user 11, such as an MMI, and comprising or being connected to an I/O interface(s) 146 that are internally all connected, through an internal bidirectional data bus 143.

The I/O interface(s) 146 may include a wired and/or a wireless interface, to exchange, over a contact and/or CTL link(s) 13, with the HSM 12, as the chip 14 interlocutor.

During a registration phase, the chip 14 registers a Secret Key (or SK). To register the SK, once the chip 14 has registered preferably reference user authentication data, the chip 14 generates preferably the SK, e.g. when the chip 14 is powered for the first time, i.e. the chip 14 is initialized, by using e.g., a RaNDom (or RND), as a seed, and a predetermined and stored key generation algorithm that uses the seed, as input data.

According to an essential invention feature, the chip (or a chip or a device cooperating with the chip 14) memory(ies) 144, such as a non-volatile memory, store(s) the SK. The SK is preferably kept secret and is stored only within the chip 14, i.e. is not exposed to outside and is not shared with any other device. The SK is therefore kept internally and is not intended to be sent to any external device. The SK is used for encrypting data to be received from outside and decrypting data to be received from outside.

The chip (or a chip or an SE cooperating with the chip 14) memory(ies) 144 store(s) preferably, in a secure manner, reference user authentication data, such as a reference Personal Identity Number (or PIN) and/or a reference biometric print(s) (like e.g., a reference fingerprint(s), a reference facial print(s) and/or a reference iris print(s)). The reference user authentication data allows authenticating the user 11.

The chip memory(ies) 144 stores an Operating System (or OS) and an application for authenticating to an authentication device, like e.g., the HSM 12 and/or other HSM(s).

To authenticate the user 11, the chip 14 is able to request (or let the authentication device request) the user 11 to provide user authentication credentials. The chip 14 is able to receive provided user authentication credentials and compare the provided user authentication credentials to a predetermined (i.e. the registered) reference user authentication credentials. If the provided user authentication credentials does not match the reference user authentication credentials, then the chip 14 fails to authenticate the user 11. Otherwise, i.e. if the provided user authentication credentials matches the reference user authentication credentials, the chip 14 succeeds in authenticating the user 11, i.e. the chip 14 ascertains that the provided user authentication credentials matches the reference user authentication credentials.

The chip 14 (or the cooperating chip or SE) memory(ies) store(s) preferably one or several IDs relating to the chip 14. The chip ID(s) may include a unique ID 2, such as a UUID 2, a URL 2, a URI 2 and/or other data that allows identifying uniquely and addressing the chip 14.

The chip 14 may be incorporated or included, possibly in a removable manner, in a Printed Circuit Board (or PCB) of the HSM 12, as a chip host device.

The chip 14 may also incorporate at least part of the host component(s), like e.g., a baseband processor, an application processor(s) and/or other electronic component(s).

In a particular embodiment, the chip 14 includes a TEE, as a secure area of a host device processor and a secured runtime environment.

Alternately, the chip 14 may be included in or removable from an SE (not represented). The SE is used by or belong(s) to the user 11, possibly as a user who owns one or several roles. The SE includes one or several chips.

The chip medium may include, instead of the HSM 12, a watch, a headset or the like, as an accessory of the HSM 12 that is able to exchange with the HSM 12. The chip medium may include any other wearable device, like e.g., a camera, a clothing, a jewel (or jewelry), a phone of the user 11 or any (electronic) device that may accommodate or integrate the SE chip, which the user 11 wears or accesses.

To authenticate to an authentication device, such as an HSM, the chip 14 is arranged to send, to an interlocutor, data, like e.g., a UID, that allows the chip 14 interlocutor to uniquely identify the chip 14.

The chip 14 is adapted to receive, from its interlocutor, a decryption request for decrypting an encrypted credential that includes or is accompanied with an encrypted credential to be decrypted.

The chip 14 is arranged to get or retrieve the (registered) SK.

According to an essential invention feature, the chip 14 is configured to decrypt the (received) encrypted credential by using the (retrieved) SK. Once the chip 14 has carried out such a decryption operation, the chip 14 gets the credential, as a result of the decrypted encrypted credential.

The chip 14 is adapted to send, to its interlocutor, as a decryption request response, the credential.

The chip 14 carries out preferably one or several security functions.

The security function(s) include(s) preferably a credential deletion (or erasure) operation that is executed, once the chip 14 has sent the result of the decryption operation. Such a chip credential deletion operation allows reducing the risk that a hacker or a malicious software retrieves the credential. The chip credential deletion operation therefore increases the protection of the concerned credential.

The security function(s) include(s) preferably a data decryption process by using a private key related to the chip 14, so as to decrypt data that is received in an encrypted manner, after its receipt from the chip 14 interlocutor.

The security function(s) include(s) preferably a data encryption process by using a public key relating to the interlocutor, as a sender of data, such as e.g., the credential, so as to generate encrypted data, prior to its sending, in a protected manner, to the chip 14 interlocutor.

Figure 2:
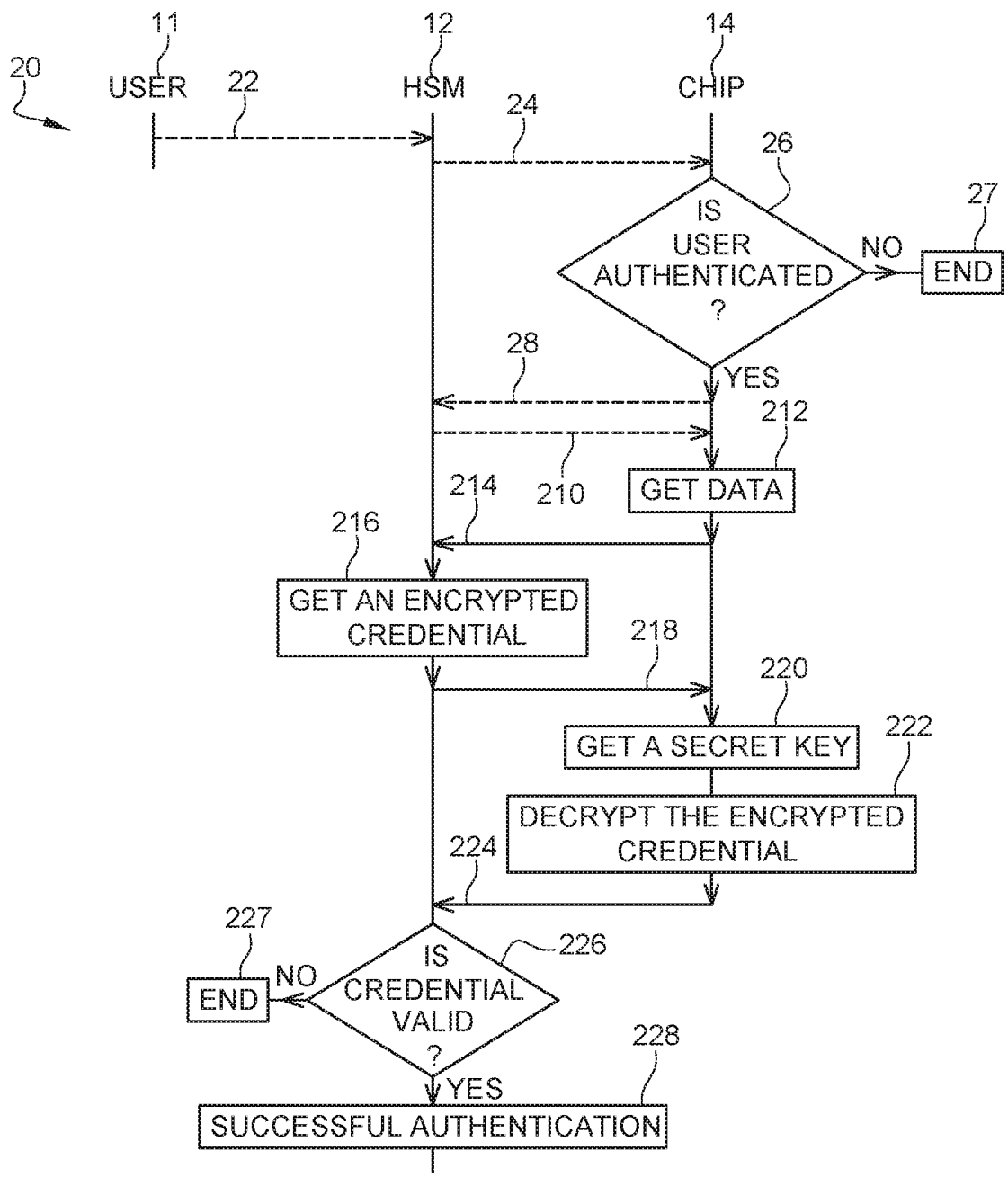
FIG. 2 represents an embodiment of a message flow between the user, the HSM and the chip of FIG. 1, so that, once the chip has provided the HSM with an identifier, the HSM sends back a decryption request along with a registered encrypted credential that the chip decrypts to send back a corresponding credential to authenticate to the HSM.

FIG. 2 depicts an exemplary embodiment of a message flow 20 that involves the user 11, the HSM 12, as an authentication device, and the chip 14, as a device to be locally authenticated before (or to) the HSM 12.

Alternately, i.e. instead of being locally situated, the chip to be authenticated is remotely located and accessible from the authentication device, possibly through a network(s), such as Internet, and possibly a chip host computing device, like e.g., a PC.

In the described example, it is assumed that the user 11 has launched a (web) browser supported by the HSM 12, in order to access one or several resources.

It is further assumed that the user 11 is registered, at the HSM 12 side, with an ID(s) relating to her/his chip 14, in a corresponding chip account among a set of chip accounts.

In a preferred embodiment, the HSM 12 is the sole server to know the chip account set and to authenticate any thus registered chip, as an HSM interlocutor.

According to another embodiment, alternatively, i.e. instead of a single server, two or more servers (not represented) are used.

Optionally, the chip 14 requests (not represented), preferably through the HSM 12 browser, the user 11 to provide user authentication credentials. The user 11 provides 22 a PIN (or the like), as user authentication credentials. The HSM 12 forwards 24 to the chip 14 the provided user authentication credentials. The chip 14 verifies 26 whether the user 11 is or is not authenticated.

To verify whether the user 11 is or is not authenticated, the chip 14 compares the provided user authentication credentials to the (registered) reference user authentication credentials. If the provided user authentication credentials does not match the reference user authentication credentials, then the chip 14 terminates 27 the launched chip 14 authentication process. Otherwise, i.e. if the provided user authentication credentials matches the reference user authentication credentials, the chip authenticates successfully the user 11. Once the chip 14 has successfully authenticated the user 11, the chip 14 sends 28 to the HSM 12 a message, such as "the user authentication credentials is validated" including a user authentication result that proves that the chip 14 has successfully authenticated the user 11. Such a successful user authentication, when present, allows unlocking the chip 14 and thus accessing the data stored in the chip 14.

It is still further assumed that the chip 14 has preferably established, further to a preferable successful user authentication, a secure communication with the HSM 12, to exchange data in a secure manner, by using e.g., a Public Key Cryptographic Standard (or PKCS). Once the secure communication is established, all of the data exchanges between the chip 14 and the HSM 12 is encrypted prior to its sending. The encrypted data sent by the chip 14 or the HSM 12 has to be decrypted by the HSM 12 or the chip 14 that receives the thus encrypted data respectively.

In a preferred embodiment (but not mandatorily), the HSM 12 requests 210 the chip 14 to receive data allowing to uniquely identify the chip 14.

The chip 14 does not need to know the HSM 12, as a chip interlocutor, prior to receiving data originating from the HSM 12.

The chip 14 gets or retrieves 212 e.g., a unique serial number, such as a UID, as data allowing to uniquely identify to the HSM 12 or any other interlocutor(s).

Then, the chip 14 sends 214 to the HSM 12 the UID, as the retrieved data allowing to uniquely identify the chip 14.

The HSM 12 gets or retrieves 216, based on the UID received from the chip 14, the (registered) encrypted credential.

Once the HSM 12 has retrieved the encrypted credential, the HSM 12 sends 218 to the chip 14 a decryption request for decrypting the encrypted credential. The decryption request includes or is accompanied with the encrypted credential.

The chip 14 does not need to know neither about the ID of the sender of the encrypted credential nor the encrypted credential per se.

Once the chip 14 has received the encrypted credential that the chip 14 sees preferably as a blob of data, the chip 14 gets or retrieves 220 the (stored) SK. The SK has been preferably on-board generated, i.e. within the chip 14. The SK never leaves the chip 14, to be kept secret.

Once the chip 14 has retrieved the secret key, the chip 14 decrypts 222 (on-the-fly) the (received) encrypted credential by using the secret key.

Then, once the chip 14 has got a result of a decryption of the encrypted credential, the chip 14 sends 224 to the HSM 12 the decryption resulting data, as decrypted encrypted credential, i.e. the credential in plain text. Prior to sending the credential, the chip 14 may concatenate to the credential, user information, such as e.g., the user 11 first name and the user 11 last name, that is preferably stored in the chip 14. Once the chip 14 has sent the credential possibly with the user information, the chip 14 deletes (not represented) preferably the resulting credential.

The HSM 12 verifies 226 whether the (received) credential is or is not valid.

To verify whether the credential is or is not valid, the HSM 12 uses (not represented) the (received) credential. More exactly, the HSM 12 gets or retrieves the (stored)

Kenc. The HSM 12 decrypts the (retrieved) Kenc by using the (received) credential. The K, as the non-encrypted Kenc, has been used for encrypting one or several resources that are authorized to be accessed. The resource(s) belong(s) to either a chip user who is authorized to access or a role that a chip user who is authorized to access. The HSM 12 decrypts the encrypted resource(s) by using the (resulting) K, as a decrypted Kenc, in order to access the resource(s).

If the HSM 12 does not succeed in decrypting the encrypted resource(s) by using the (resulting) K, then the HSM 12 ascertains that the (received) credential is not valid. In other words, the HSM 12 does not authenticate the credential. If the HSM 12 does not authenticate the credential, then the HSM 12 terminates 227 the launched chip 14 authentication process.

Otherwise, i.e. if the HSM 12 succeeds in decrypting the encrypted resource(s) by using the (resulting) K, the HSM 12 ascertains that the (received) credential is valid, i.e. if the HSM 12 authenticates the credential, the HSM 12 authenticates 228 successfully the chip 14 and therefore the user 11, and possibly for his/her role, when applicable.

Once the HSM 12 has successfully authenticated the chip 14, the HSM 12 may display (not represented), possibly through the HSM 12 browser, to the user 11 a message, such as "the credential is authenticated" including either a successful user authentication result or a successful user role authentication result that proves that the HSM 12 has successfully authenticated the chip 14. Such a successful chip authentication allows the HSM 12 to authorize the chip 14 to gain access to one or several requested (registered) resources that have been successfully decrypted by using the received credential.

Once the HSM 12 has either succeeded in authenticating the credential or failed to authenticate the credential, the HSM 12 deletes (not represented) preferably the received credential.

When authenticated, the chip 14 is authorized to gain access to one or several associated resources.

The chip 14 does not need to store neither a credential nor an encrypted credential nor a user role ID, when applicable.

The invention solution allows each chip to be authenticated to store only its own secret key.

The invention solution allows authenticating, simply, securely and efficiently, a chip (or a device) that does not need to be provisioned with neither a credential nor an encrypted credential.

The invention solution allows a chip user to use a single chip to authenticate to one or several authentication devices, to switch from a role to another role without needing to swap from the chip to another chip, when applicable.

Such a chip authentication invention method may be used in a key ceremony process that needs to concatenate at least a minimum number M of user roles, i.e. at least a minimum number M of credentials, which have been successfully authenticated by the HSM 12, among a number of N user roles, to access a requested resource(s).

The invention claimed is:

1. A method for authenticating to a device, comprising:
registering data associated with a credential related to a user role on said device thereby producing an encrypted credential with corresponding registered data;
deleting the credential responsive to said registering;
receiving, by the device, from a chip, said registered data;
retrieving, by the device, based on the registered data received, said encrypted credential that was encrypted by the chip during sail registering;
sending, by the device, to the chip, a decryption request for decrypting the encrypted credential including or being accompanied with the encrypted credential to be decrypted;
retrieving, by the chip, a secret key;
decrypting, by the chip, the encrypted credential by using the secret key to reproduce said credential;
sending, by the chip, to the device, as a decryption request response, the credential;
deleting the credential reproduced on the chip; then
verifying, by the device, whether the credential for said user role is or is not valid;
deleting the credential reproduced on the device; and then
authenticating the chip for said user role, by the device, only if the credential for said user role was deemed valid during said verifying.

2. The method according to claim 1, wherein, to ascertain that the credential related to said user role associated with said encrypted credential is valid, the device decrypts successfully a predetermined encrypted key by using the credential, a key, as a decrypted encrypted key, having been used for encrypting at least one resource that belongs to either a chip user who is authorized to access the at least one resource or a role which a chip user has and authorizes to access the at least one resource, the device decrypts at least one encrypted resource by using the key, in order to access the at least one resource.

3. The method according to claim 1, wherein, prior to decrypting the encrypted credential, the chip had successfully authenticated the user during said registering.

4. The method according to claim 3, wherein, to authenticate successfully the user, the chip requests the user to provide user authentication credentials, the chip compares the provided user authentication credentials to predetermined reference user authentication credentials and the chip ascertains that the provided user authentication credentials matches the reference user authentication credentials.

5. An authentication device comprising:
a microprocessor;
at least one memory configured to store, for each chip to be authenticated, registered data in association with a predetermined encrypted credential; and
an interface,
wherein microprocessor of the authentication device is configured to:
register data associated with a credential related to a user role on said device thereby producing an encrypted credential with corresponding registered data;
deleting the credential responsive to said registering;
receive, via the interface, from a chip, said registered data;
retrieve, from the at least one memory, based on the registered data received, an associated encrypted credential that was encrypted by the chip during said registering;
send, via the interface, to the chip, a decryption request for decrypting the encrypted credential including or being accompanied with the encrypted credential to be decrypted to reproduce said credential;
receive, via the interface, from the chip, as a decryption request response, the credential, that credential since deleted on the chip responsive to sending it;
verify, whether the credential is or is not valid;
delete the credential on the authentication device; and then
authenticate the chip for said user role, only if the credential was deemed valid during said verify.

6. The authentication device according to claim 5, wherein the authentication device is at least one element comprised in a group including:
- a hardware security module type device;
- a mobile device;
- a mobile phone;
- a user terminal;
- a Personal Computer,
- a tablet;
- a computing device.

7. A chip for authenticating to a device, the chip comprising:

a microprocessor;

at least one memory configured to store registered data and a secret key, said registered data associated with a credential related to a user role on sail device; and an interface configured to communicate with the device, wherein the microprocessor of the chip is configured to:

register the data associated with the credential related to the user role on said device thereby producing an encrypted credential with corresponding registered data stored in the at least one memory;

delete the credential responsive to said registering;

retrieve, by the device, based on the registered data, said encrypted credential that was encrypted by the chip during said registering;

send, via the interface, to said device, the registered data stored in the at least one memory;

receive, via the interface, from the device, a decryption request for decrypting the encrypted credential that was encrypted by the chip, including or being accompanied with the encrypted credential to be decrypted;

retrieve the secret key from the at least one memory;

decrypt the encrypted credential by using the secret key to reproduce said credential;

send, via the interface, to the device, as a decryption request response, the credential; and delete said credential reproduced on said chip after said send wherein the device verifies whether the credential for said user role is or is not valid;

deletes the credential reproduced on the device; and then authenticates the chip for said user role only if the credential for said user role was deemed valid during said verifying.

\* \* \* \* \*